United States Patent [19]

Walker

[11] 3,884,716

[45] May 20, 1975

[54] STORAGE BATTERY PLATE HAVING A CORE OF ALUMINUM AND A METHOD OF PREPARING THE SAME

[76] Inventor: Henry D. Walker, 4906 Bluebell Ave., North Hollywood, Calif.

[22] Filed: Mar. 11, 1974

[21] Appl. No.: 449,921

Related U.S. Application Data

[63] Continuation of Ser. No. 313,835, Dec. 11, 1972, abandoned.

[52] U.S. Cl. .................... 136/26; 136/27; 136/64
[51] Int. Cl. ........................................ H01m 35/00
[58] Field of Search .............................. 136/26–27, 136/64–67, 19, 56, 57

[56] References Cited
UNITED STATES PATENTS

| 715,343 | 12/1902 | Blanc | 136/64 |
|---|---|---|---|
| 773,961 | 11/1904 | Morgan | 136/52 |
| 1,068,439 | 7/1913 | Marino | 136/64 |
| 2,713,079 | 7/1955 | Carrick et al. | 136/56 X |

*Primary Examiner*—Anthony Skapars
*Attorney, Agent, or Firm*—McDougall, Hersh & Scott

[57] ABSTRACT

A storage battery plate is provided having a core of aluminum, for example, which has its oxide coating replaced by a thin film coating of a metal such as zinc. The zinc in turn is coated with a thin layer of silver. Lead is thereafter deposited over the silver coating in the usual manner to form a battery plate.

8 Claims, No Drawings

STORAGE BATTERY PLATE HAVING A CORE OF ALUMINUM AND A METHOD OF PREPARING THE SAME

This is a continuation of application Ser. No. 313,835, filed Dec. 11, 1972, now abandoned.

BACKGROUND OF THE INVENTION

This invention relates to plates for electrical storage batteries and, more particularly, to an improvement in the method and means of the construction thereof.

OBJECTS AND SUMMARY OF THE INVENTION

An object of this invention is to produce an improved plate for an electric storage battery whereby an improved electric storage battery is made possible having an increased life and which can be more rapidly charged than presently available storage batteries.

Another object of the invention is to provide a battery construction which is compact, lighter in weight, and has smaller cells than the standard lead-antimony type of battery cell.

Still another object of this invention is to provide a novel and improved construction for a storage battery.

These and other objects of the invention are achieved by providing a battery plate which is made of a light-weight and conductive metal, preferably aluminum. The oxide coating usually present on the surface of the aluminum is replaced by a coating of a metal such as zinc, simultaneously with a removal of the oxide coating. A thin silver coating is flashed over the zinc coating. Thereafter, the plates are coated with lead in the usual manner to form battery plates. Thereafter, if desired, the antimony usually present in the lead coating, may be removed in order to minimize the effects of impurities which may occur as a result of the presence of antimony.

The novel features of the invention are set forth with particularity in the appended claims. The invention will best be understood from the following description.

DESCRIPTION OF THE PREFERRED EMBODIMENTS

In accordance with this invention, in order to obtain as light a battery as possible, the core of the plate of the battery is made of a lightweight conductive metal, preferably aluminum. While other metals such as copper or silver are considered, however, aluminum has the highest conductivity per unit of weight, is most economical and has adequate physical strength, and therefore, is preferred. Aluminum cells which are four times smaller than the same size of the usual leadantimony cells will have four times more ampere hours current carrying capacity and, thus are advantageous.

The aluminum should preferably be of a commercially pure type. The aluminum is formed into a shape suitable for a battery plate. The plate is then cleaned in well known manner in a solution of a detergent in which a suitable wetting agent has been placed. It is thereafter washed in water. The aluminum must be provided with a barrier layer to the lead.

In accordance with this invention, both a barrier layer is provided and the internal resistance of the battery cell is minimized by removing the natural aluminum oxide which coats the surface of the aluminum while simultaneously replacing it with a protective conductive coating. A protective coating may be applied using metals, such as zinc, nickel, or chrome, but zinc is preferred because it is a better thermal conductor and its thermal expansion and contraction characteristics are more compatible with those of aluminum. The protective coating is applied by dipping the core in a solution consisting of from 13 to 70 ounces of zinc oxide per gallon of sodium hydroxide at room temperature. After the first dipping of from 2 to 5 seconds, a second dipping for from 2 to 5 seconds is advised. To improve the bonding of the coating additives, they are added to the solution into which the core is dipped. These may be a solution of 1 to 5 ounces of either ferric chloride or rochelle salts to a gallon of water. These additives insure that a tightly bonded zinc film, without cracks or blisters is left on the aluminum surface.

The solution into which the aluminum plate is dipped is at room temperature. A weight of about 0.02 mg. of zinc per square inch is desirable. This is achieved by the recommended time of dipping. Any excess which is deposited may be spongy, which is not desirable. The other indicated metals namely, nickel, or chrome, may be deposited using the same method as described for zinc, but zinc is preferred. The reason the aluminum oxide is removed while simultaneously depositing the zinc coating is to prevent reformation of the aluminum oxide, which is an insulator, and makes a poor contact with other material.

If an inspection reveals, after the first zinc dipping that there are still impurities on the surface, the battery plate is dipped into a solution of 50% nitric acid at room temperature for a few seconds. Thereafter, the battery plate is rinsed in pure water and dipped in the original zinc oxide sodium hydroxide mixture again.

Thereafter, the aluminum plate which is now coated with zinc has a second barrier layer of a metal, such as silver, a few angstroms thick, deposited over the zinc coating. This is achieved by placing the battery core for from 2 to 4 seconds in a regular silver plating solution. By way of example, the silver plating solution can be a mixture of ½ to ¾ ounce of silver cyanide to a gallon of water. This solution is mixed with an equal solution of 10 to 12 ounces of potassium cyanide to a gallon of water. Temperature of the solution is maintained between 70° to 85°. The voltage which is applied to the electrolytic solution is from 4 to 6 volts and the current density is from 15 to 25 amperes per square foot.

The two barrier layers which are deposited on the aluminum core prevent any grain migration between the aluminum and the lead and avoid any galvanic action that otherwise acts to deteriorate the cell and tend to increase its resistance.

The final lead coating which is deposited on the cell can be applied by electroplating, spraying, sintering, or any other well known techniques. With a cell of this construction, purer lead may be employed than otherwise. Antimony is usually present in standard battery plates. It is added to the lead or alloying constituents to increase hardness of the lead used in the manufacture of the plates. Such plates release a large proportion of the surface antimony which migrates toward the negative plates, thereby contaminating the electrolyte and adversely affecting battery performance, as by increasing the positive plate corrosion (i.e., giving it a shorter life), and increasing the selfdischarge rate. Also, the positive plate is prevented from reaching its true potential. These problems may be avoided when pure lead is used. With the battery plate made in accordance with the present invention, there is no need for a hard lead plate and therefore, pure lead can be used. Pure lead normally has up to 0.5% of antimony, which has little effect in cell operation. Antimony may be removed from the lead which has been deposited on the battery plate by dipping the lead covered battery plate into a solution made of a mixture of 2 to 5 volumes of hydrogen perioxide with one volume of sulfuric acid having a gravity of 1.2, for a time on the order of one hour.

There has accordingly been described herein a novel method and means for constructing a battery plate for use in a storage battery which provides a battery having the following advantages over presently known batteries. The battery plate is lighter and may be made smaller with the same or better current capacity than presently known battery plates. A battery made in accordance with this invention charges faster and has a longer discharge time.

What is claimed is:

1. A method of preparing a battery plate for a lead-acid storage battery comprising:
   forming the core of said battery plate out of aluminum,
   depositing a barrier coating over said core of one of the metals selected from the group consisting of zinc, nickel and chrome,
   depositing a silver coating over said barrier coating, and
   applying a lead coating over said silver coating.

2. A method as recited in claim 1 wherein there is included the step of cleaning the core prior to depositing a barrier coating over said core.

3. A method as recited in claim 1 wherein the step of depositing a barrier coating over said core comprises:
   immersing said core in a solution of one gallon of sodium hydroxide in which there has been mixed 15 to 70 ounces of one of the metals selected from the group consisting of zinc, nickel and chrome at room temperature for an interval on the order of 2 seconds.

4. A method as recited in claim 1 wherein said step of depositing a second barrier coating comprises electrolytically depositing said second barrier coating.

5. In a lead-acid battery wherein the battery plates are coated with lead, the improvement comprising:
   an aluminum core for each said battery plate,
   a coating of zinc over each said aluminum core, and
   a coating of silver over each said zinc coating, on which said lead coating is deposited.

6. In a lead-acid battery as recited in claim 5 wherein said zinc coating has a weight on the order of 0.02 milligrams per square inch of one surface, and said silver coating is on the order of a few angstroms thick.

7. In a lead-acid type storage battery, a method of preparing a battery plate comprising:
   forming the core of said battery plate out of aluminum,
   depositing a coating of zinc over said aluminum surface while simultaneously removing the oxide coating which is on said aluminum surface,
   depositing a coating of silver over said zinc coating, and
   depositing a lead coating on the surface of silver.

8. The method as recited in claim 7 which includes the additional step of immersing said plate after it has been coated with lead in a solution of 2 to 5 volumes of hydrogen peroxide to one volume of sulfuric acid having a gravity of 1.2, for a time on the order of ½ hour to remove antimony from said lead coating.

* * * * *